J. C. TERRY.
VEHICLE TOP.
APPLICATION FILED JAN. 10, 1920.
1,437,950.
Patented Dec. 5, 1922.
3 SHEETS—SHEET 1.
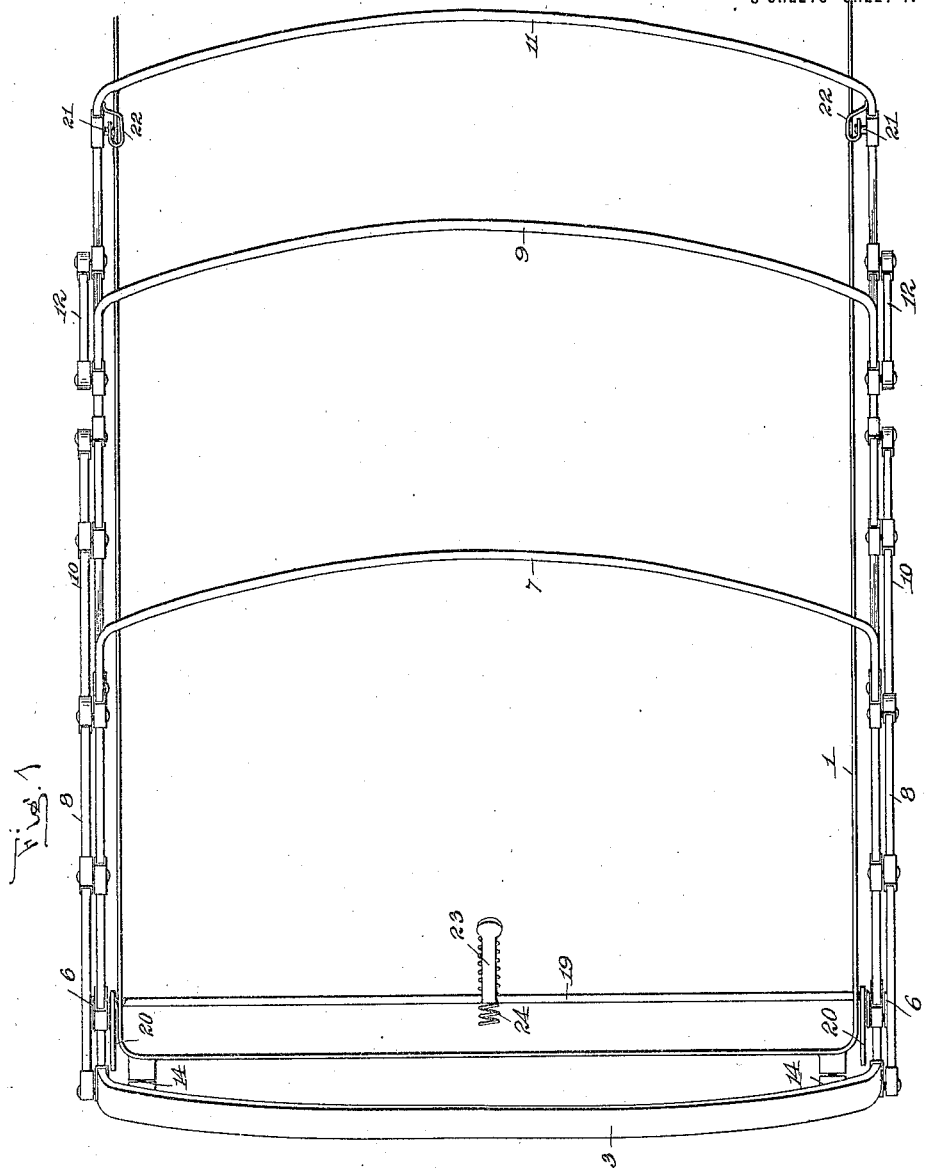
Inventor
John C. Terry
his Attorneys

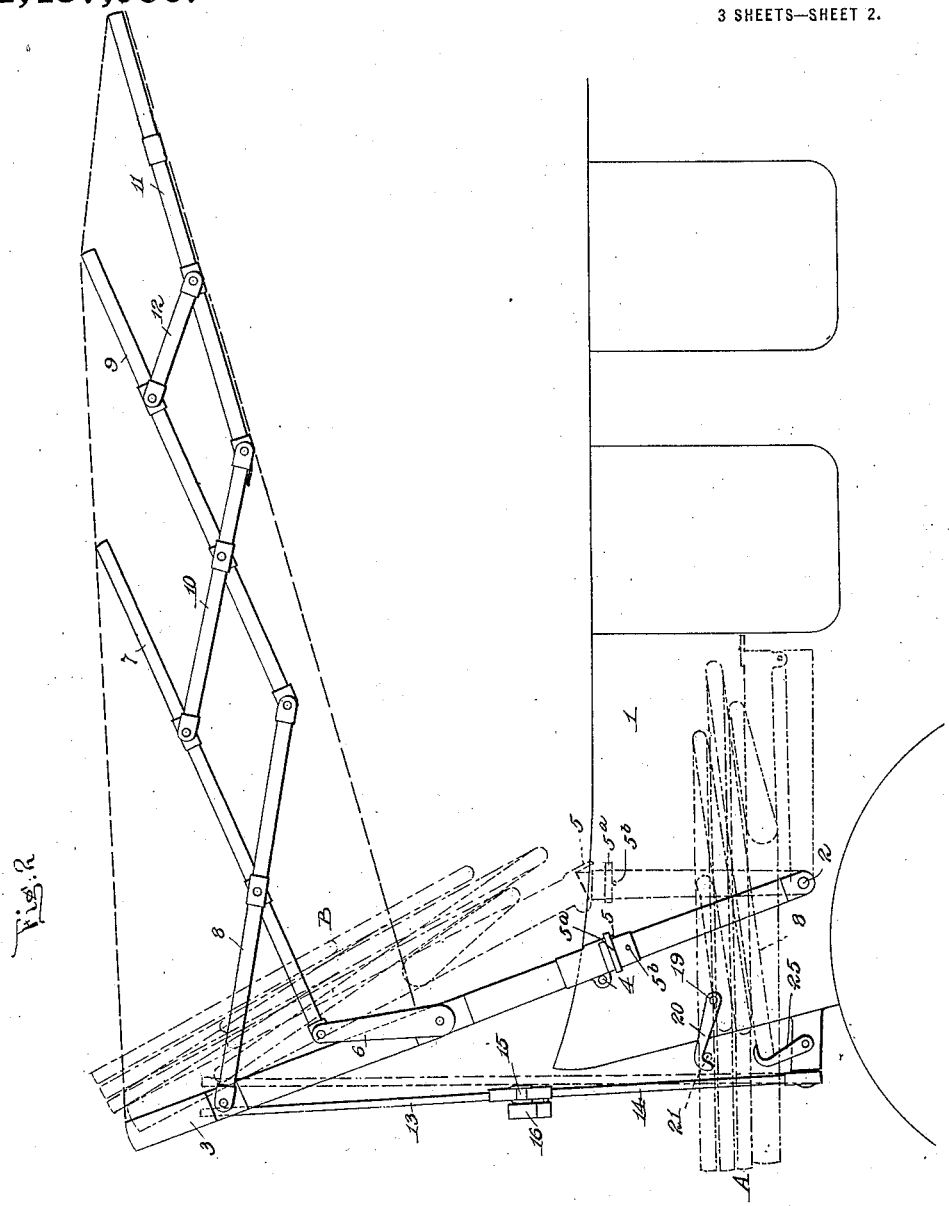

J. C. TERRY.
VEHICLE TOP.
APPLICATION FILED JAN. 10, 1920.
1,437,950.
Patented Dec. 5, 1922.
3 SHEETS—SHEET 3.
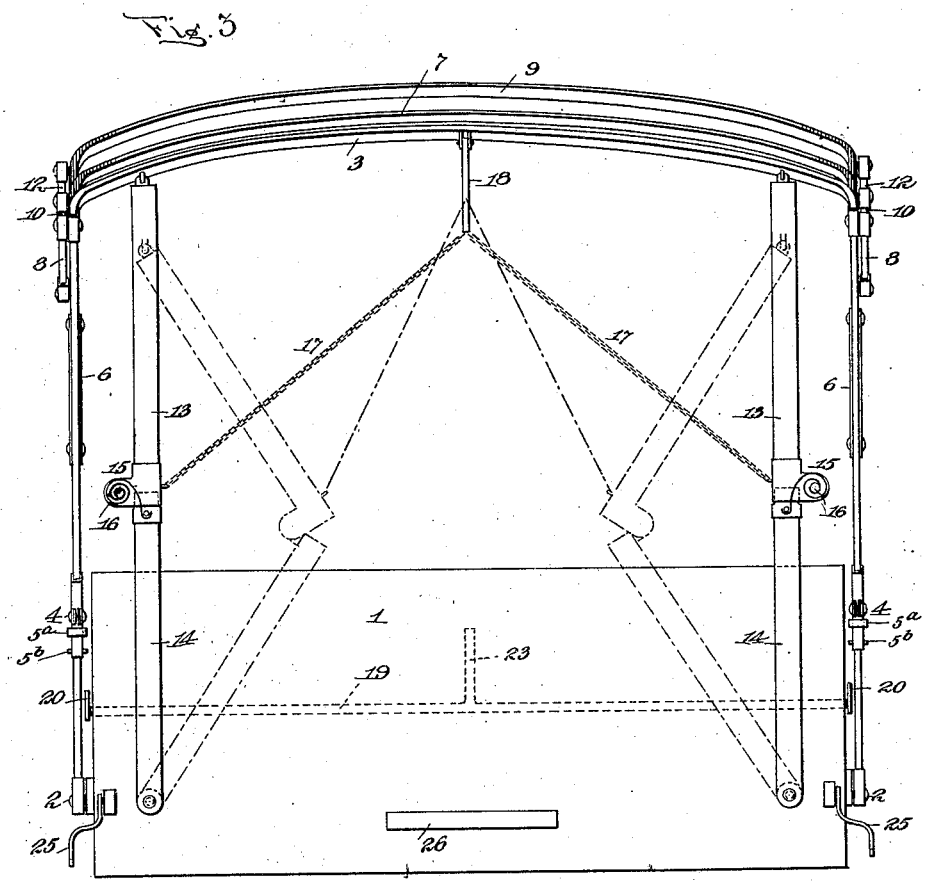
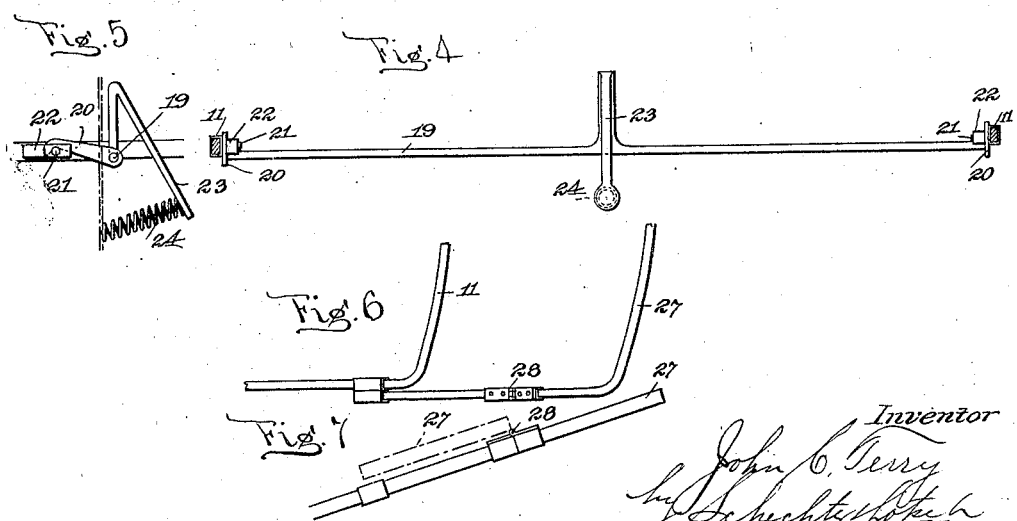

Patented Dec. 5, 1922.

1,437,950

UNITED STATES PATENT OFFICE.

JOHN C. TERRY, OF LONG ISLAND CITY, NEW YORK.

VEHICLE TOP.

Application filed January 10, 1920. Serial No. 350,600.

*To all whom it may concern:*

Be it known that I, JOHN C. TERRY, a citizen of the United States, and a resident of Long Island City, borough of Queens, and State of New York, have invented a certain new and useful Improvement in Vehicle Tops, of which the following is a specification.

My invention relates to vehicle tops, and more particularly to tops or covers for automobiles of the folding type, and has for its objects the production of a vehicle top which may be easily raised and lowered, which, when lowered or folded, will lie below the level of the upper edge of the vehicle body and be out of the range of vision of the occupants of the vehicle, which will be partially automatic whereby it may be easily operated by one person, which will be securely locked in folded position, which will not rattle, which will be economical of construction, and which will not easily get out of order.

A further object of my invention is to produce a vehicle top having means for automatically raising the same.

A further object of the invention, is to produce a device of the character described, which is extremely simple in construction, neat and attractive in appearance, thoroughly reliable and efficient in its purpose, and inexpensive to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The inventive idea involved is capable of receiving a variety of mechanical expressions, some of which for the purpose of illustrating the invention, are shown in the accompanying drawings.

The invention will be first described in connection with the accompanying drawings, wherein similar reference characters are used to designate corresponding parts throughout the several views, and then more specifically defined and indicated in the appended claims.

In the drawings,—

Fig. 1 is a plan view of a portion of an automobile provided with my invention, the top being shown as extended;

Fig. 2 is a side elevation of the same, showing in dotted lines various positions assumed by the top;

Fig. 3 is a rear elevation;

Fig. 4 is a detail front elevation, partly in section, of the locking mechanism;

Fig. 5 is a detail side elevation of the same;

Fig. 6 is a top plan view of a modification; and

Fig. 7 is a side elevation of the same.

In the drawings, 1 designates the body of a motor car which may be of any desired type or construction. Pivoted at 2 at either side of the body is a rear bow 3. The legs of the bow are jointed at 4, 4 and a lip 5 at or near the joint prevents breaking of the joint in one direction.

Means may be provided for preventing breaking of the joint in the opposite direction, and for that purpose a sleeve $5^a$ may be loosely mounted on the lower bow member. When the top is in extended position the sleeve may be moved upward over the lip 5, and the member cannot be broken in either direction. The sleeve may be held in locking position by friction or by any other desired means. A stop $5^b$ is provided to limit the downward movement of the sleeve.

Pivoted to each leg of the bow 3 and above the joint 4 is a lever 6 composed of two plates, one on each side of the leg. Pivoted in the free ends of the levers 6 are the legs of a second bow 7. Pivoted to each leg of the bow 3 above the pivots of the bow 7 is an arm 8, which arms are also pivoted to the legs of the bow 7.

Pivoted to the free extremities of the arms 8 are the legs of a third bow 9, to each of which is pivoted an arm 10, one end of which is pivoted to the bow 7, and the free extremities of which are pivoted to the legs of a fourth bow 11. A rod 12 pivotally connects the legs of the third bow with those of the fourth. The above described construction produces a lazy-tongs arrangement of which the bow 3 is the anchor member.

Pivoted on each side of the rear of the vehicle is a strut comprising two members 13 and 14 hinged together at 15. The pivot of the hinge is rigidly secured to the member 13, and has secured thereto the inner end of a spiral spring 16, the outer end of which is secured to the member 14.

The upper end of each strut member 13 is pivotally attached to the under side of the bow 3, and each member 13 is attached by means of a chain or other flexible connection 17 to a lever 18 pivoted to the under side of the bow 3 at the center thereof. The lever 18 is capable of pivotal movement longitudinally of the body 1.

Extending transversely of the body, and preferably inside thereof in proximity to the back, and concealed by the back cushion of the rear seat is a rock shaft 19 which extends through each side of the body. Each end of the shaft is provided with a hook 20 which is adapted to engage over a stud 21 carried by the fourth bow 11 when the top is in the folded position, as shown in dotted lines at A in Fig. 2. Cooperating with each stud 21 is a spring 22. This will prevent rattling and play between the elements.

At or near the center of the shaft 19 is an arm 23, and a spiral spring 24 is interposed between the arm and the back of the body. The spring 24 tends to retain the hooks 20 in position to engage the studs 21.

When the bows and lazy-tong members are formed of wood, they may be provided at each pivotal point with a metallic ferrule, as shown, to prevent wear.

If desired, hooks 25 may be employed as supplemental means for securing the top in folded position. When used, the hooks 25 may engage over the ends of the bars 8, as shown in dotted lines at A in Fig. 2.

The operation is as follows:—

When the top is in folded position as shown at A, in Fig. 2, the hooks 20 are engaged over the studs 21, and the hooks 25 engage over the bars 8 at each side of the body and the top is securely locked in folded position with the struts 13, 14 folded transversely of the body and resting on the support 26.

When it is desired to raise the top, the hooks 25 are cast off. If desired, the hooks may be carried by a common shaft whereby they may be operated in unison and from one side of the car.

The operator will now depress the arm 23 against the tension of the spring 24 and swing the hooks 20 away from the studs 21. The springs 16 which have been placed under tension by the folding of the struts, will unwind and automatically bring the struts to the upright position shown in full lines in Fig. 3. This will raise the bows 3, 7, 9 and 11 to the position shown in dotted lines at B, Fig. 2.

When in the position B, the legs of the bow 3 are broken, as shown. The operator will now press the legs of the said bow back until the lip 5 engages the lower member of the leg. This will bring the members of the legs of the bow into alignment, and they will be locked against further backward movement by the lip, and the bow 3 will assume the position shown in full lines in Fig. 2.

The operator will now swing the lever from the positions shown in dotted lines at B, to the position shown in full lines. This will extend the lazy-tong frame to the position shown in Fig. 2, and the top will be in raised position.

To lower the top, the above described operation is reversed, and the lever 18 is operated so as to break the joints between the strut members 13 and 14, as is indicated in dotted lines in Fig. 3. This will cause the top to be lowered, and when in desired position the fastening means are applied to rest the same in such lowered position.

For use with cars having extremely long bodies, or when it is desired to extend the top over the engine hood, a supplemental cover bow 27 may be employed. This bow is hinged as at 28, and the legs are pivoted to the bow 11 as shown in Figs. 6 and 7. When folding the top, the bow 27, and the cover carried thereby, is first folded back over the bow 11 and the top is folded as before.

In accordance with the provisions of the patent statute, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention.

Having now described my invention, what I claim as new and desire to secure by Letters Patent is as follows:—

1. A vehicle top comprising a main bow adapted to be folded and extended and to be pivoted to the vehicle, lazy tongs extending forwardly from each side of the main bow, when the same is in extended position, struts pivoted to the main bow and adapted to be pivoted to the vehicle, said struts comprising hinged members adapted to be folded one upon the other, means for securing the strut members in folded position, and means for automatically extending the strut members to raise the main bow when said securing means are released.

2. A vehicle top comprising a U-shaped element adapted to be pivoted to the sides of a vehicle, the legs of said element being jointed, whereby the element may be folded, a strut pivoted to the element and adapted to be pivoted to the vehicle, said strut comprising two members hinged together, a spring for normally holding the strut members in alignment, means for breaking the joint at the hinge to fold the strut, means for locking the strut in folded position, and means for unlocking the strut whereby the spring will move the members to aligned position and unfold the element.

3. A vehicle top comprising a U-shaped element adapted to be pivoted to the sides of a vehicle, the legs of said element being jointed, whereby the element may be folded, a strut pivoted to the element and adapted to be pivoted to the vehicle, said strut comprising two members hinged together, a spring for normally holding the strut members in alignment, means for breaking the joint at the hinge to fold the strut, means for locking the strut in folded position, means for unlocking the strut whereby the spring will move the members to aligned position and unfold the element, a lazy-tong carried at each side of the element, said lazy-tongs being secured together, and means for locking the lazy-tongs in folded position against the element.

This specification signed this 15th day of December, 1919.

JOHN C. TERRY.